INVENTORS
WILHELM LINNERZ,
HELMUT GOLLER,
BY
Paul H. Smolka,
THEIR ATTORNEY 3,391,564
EXTRUSION PRESSES
Wilhelm Linnerz, Buttgen, near Neuss, and Helmut Goller, Dusseldorf, Germany, assignors to Lindemann Maschinenfabrik G.m.b.H., Dusseldorf, Germany
Filed Oct. 21, 1965, Ser. No. 499,622
Claims priority, application Germany, Dec. 29, 1964, L 49,624
4 Claims. (Cl. 72—263)

ABSTRACT OF THE DISCLOSURE

An extrusion press having a countersupport, an axially movable cylinder and an arm rotatable about an axis parallel to but offset laterally from the extrusion axis. The arm carries a die and a thrust plate serving to support the die against the countersupport during the extrusion process. The arm is so mounted that it can move axially and its free end is provided with a radially extending slot for accommodating a cutting means between the retained thrust plate and the die after the same has been retracted axially by the arm. In order to eliminate bending moments in the arm during extrusion the arm is locked against axial displacement and is supported by a lug means between the arm and the countersupport.

---

This invention relates to improvements in extrusion presses of the character used particularly for extruding metal, although it may be useful for other materials.

In extrusion presses for extruding metal, the extruded material is detached from the extrusion residue either between the cylinder and the die or on that side of the die which faces away from the cylinder, depending on the circumstances. If operation is to be conducted in the latter manner and if the press has as a support for the die an arm rotatable about an axis parallel to but offset laterally from the extrusion axis of the press, then according to a known proposal the detachment can be effected by making use of the arm for the further purpose of serving as a means for shearing off the extrusion.

When this is done, the arm is swung out of its extrusion position through an angle at the end of each extruding operation, so that the extruded material is shorn off by the edges of the end faces of a countersupport, and of the arm which supports the die during extrusion since these end faces bear against one another. In this case, however, the waste of extruded material is rather considerable, because the end of the extruded material, which is left on the extrusion residue and is lost with it, is long because it extends all the way from the inside of the die to the countersupport. Moreover, the extrusion separated from this piece is crushed over part of its length where it is shorn, and this part also, therefore, becomes waste. This applies in particular to hollow extrusions which are squashed as they are shorn.

The object of this invention is to make the loss of material, when the extrusion is cut from the residue, considerably smaller.

According to this invention, the press still comprises a countersupport, an axially movable cylinder and an arm rotatable about an axis parallel to, but offset laterally from, the extrusion axis, the arm carrying a die and a thrust plate serving to support the die against the countersupport during the extrusion process, but, in addition a retaining means is provided on the countersupport and secures the thrust plate to the countersupport when the arm and thrust plate are in the extrusion position, the arm being mounted so that it can move in the direction of its axis of rotation and having at its free end a radially extending slot for introducing a saw between the retained thrust plate and the die after the die has been retracted axially by the arm.

By means of this arrangement, when the extrusion is detached, it is possible to saw close up to the die and thereby keep the end of the extruded material remaining on the extrusion residue, very short. Moreover, because a saw can be employed for the detaching operation, this does not crush the extrusion.

In a preferred constructional form of the invention, the retaining means locks the thrust plate against axial displacement, but leaves it free to move in the radial direction when the arm is rotated. When the die is swung into the extrusion position, the thrust plate then moves automatically into the position in which it is locked to the countersupport and in the opposite direction without any special steps being taken. A particularly simple construction is obtained when a ledge disposed on the countersupport is provided as the retaining means, the ledge engaging a flange on the thrust plate when the thrust plate is in the extrusion position.

Before the extruded material is detached, either in the manner described by sawing in the slot or by sawing between the die and the retracted cylinder, the extrusion residue, which generally adheres tightly to the die, must be pulled away from the die. To this end, the cylinder is retracted while the die is held back by the arm. Thus, the force pulling the extrusion residue away acts on the free end of the arm and therefore produces considerable bending moments in the arm and the shaft carrying it. In order to exclude any overloading, provision is, therefore, preferably made for additional support. In a known extrusion press, this purpose is served by a radially displaceable bolt mounted on the countersupport, the bolt engaging over the free end of the arm in the locking position and taking up all the forces acting on the arm. It is true that this bolt fulfills its purpose of relieving the load on the arm, but it has the drawback of occupying a considerable amount of room between the countersupport and the retracted cylinder which is required for the cutting tool and for holding and mounting it.

In order to remedy this drawback, the arm is arranged to be locked against axial displacement and is supported in the axial direction by a lug on a part of the arm on the side of its axis of rotation remote from the extrusion axis, the lug bearing against the countersupport. The force acting on the arm when the extrusion residue is pulled away is then taken up, as in a beam supported at two points, by two abutments offset radially with respect to one another, namely, first, by the axial locking device and, second, by the support of the lug on the countersupport. The stresses in the arm are thereby reduced considerably and the shaft of the arm is completely relieved of bending. Support being equally good, the supplementary bolt used in the known construction is dispensed with and the space occupied by this bolt is free for the cutting tools. It is true that the known construction also provides axial locking, but in this case the latter does not have the load-relieving action which is the aim of this invention.

In the known press, the bolt also serves to support the arm in the radial direction, referred to as the extrusion axis of the press; that is, it serves to take up the radial forces occurring during the shearing operation. The invention in its preferred constructional form likewise provides for this purpose a disengageable locking device for the arm in this direction, the device engaging over the head of the arm in the extrusion position. Whereas in the known press, however, the locking device consists of a radially movable slide which must always be extended during the sawing operation, according to this invention a bolt is movable in the axial direction, with the consequence that the locking device again does not occupy, either in the locked or unlocked position, any space which is required for other purposes. The locking device may consist, with advantage, of two bolts arranged on opposite sides of the arm.

An example of an extrusion press constructed in accordance with the invention is illustrated in the accompanying drawings in which.

Figure 1:
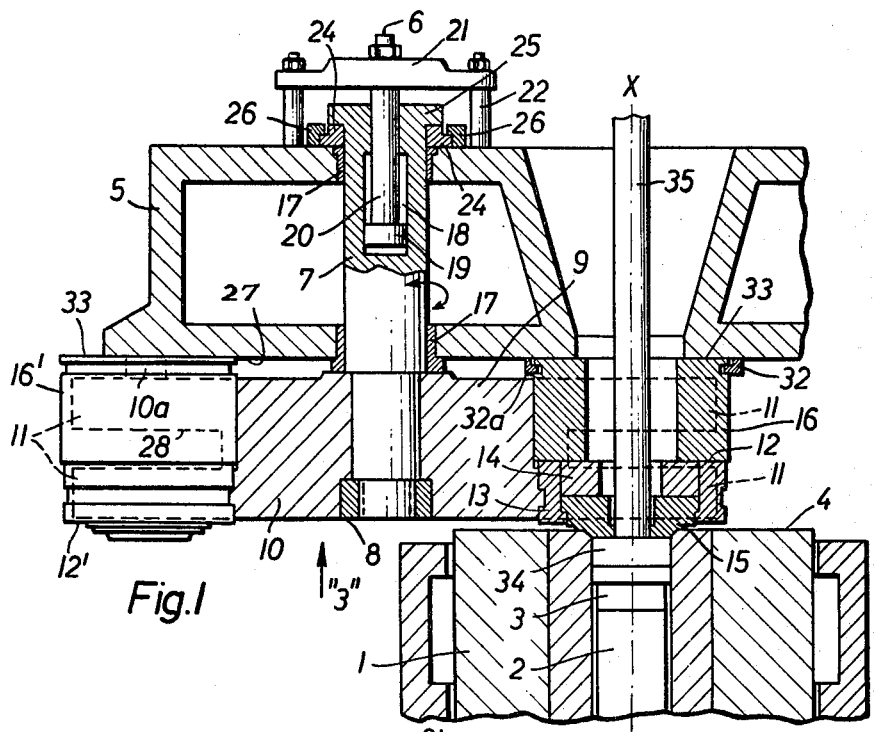
FIG. 1 is a horizontal longitudinal section through the middle part of the press as seen in the direction of the arrows on the line 1—1 in FIG. 3, the press being in the extrusion position.

The press shown in the drawings comprises, in the usual manner, an axially movable cylinder 1, with an extrusion plunger 2 mounted in it and having an extrusion plate 3 on its end. The end face 4 of the cylinder 1 is disposed in opposed relation to an immovably mounted countersupport 5. A die carrier 8 is rotatable about an axis 6 (FIG. 1) and is secured to a shaft 7. The die carrier has the form of a double arm 8, the two arms 9 and 10 of which are identical.

Each of the two arms 9 and 10 terminates in forks 11 which receive a die 12 therein. In the example shown, the die consists of a set of two rings and a disc, namely an outer ring 13, an inner ring 14 and a disc 15 containing the die orifice proper. The fork moreover accommodates a thrust plate 16, by means of which the die 12 is supported against the countersupport 5 during the extrustion process.

Figure 4:
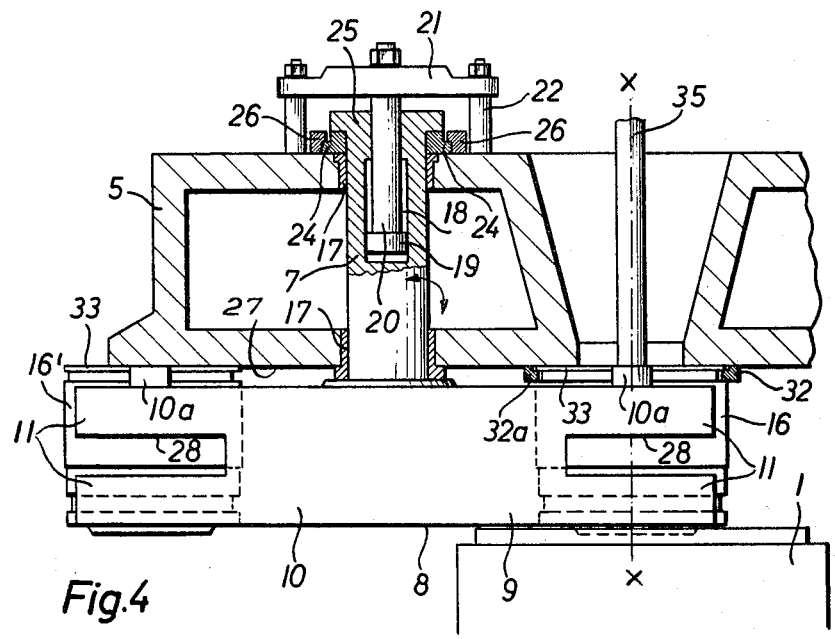
FIG. 4 is a section corresponding to FIG. 1, partly in elevation, and showing further details.

As shown particularly in FIG. 4, the shaft 7 of the double arm 8 is movable axially in its bearings 17 mounted in the countersupport 5. To this end, the shaft 7 is provided with a cylindrical bore 18 in which there is a fixed piston 19 connected to the countersupport 5 by means of a piston rod 20, a cross-piece 21 and stay bolts 22. By putting one or the other of the chambers formed in the cylinder 18 by the piston 19 under pressure, the shaft 7 can be displaced axially. Fluid may be admitted to the cylinder 18 on either side of the piston 19 through suitable conduits, for this purpose.

Figure 3:
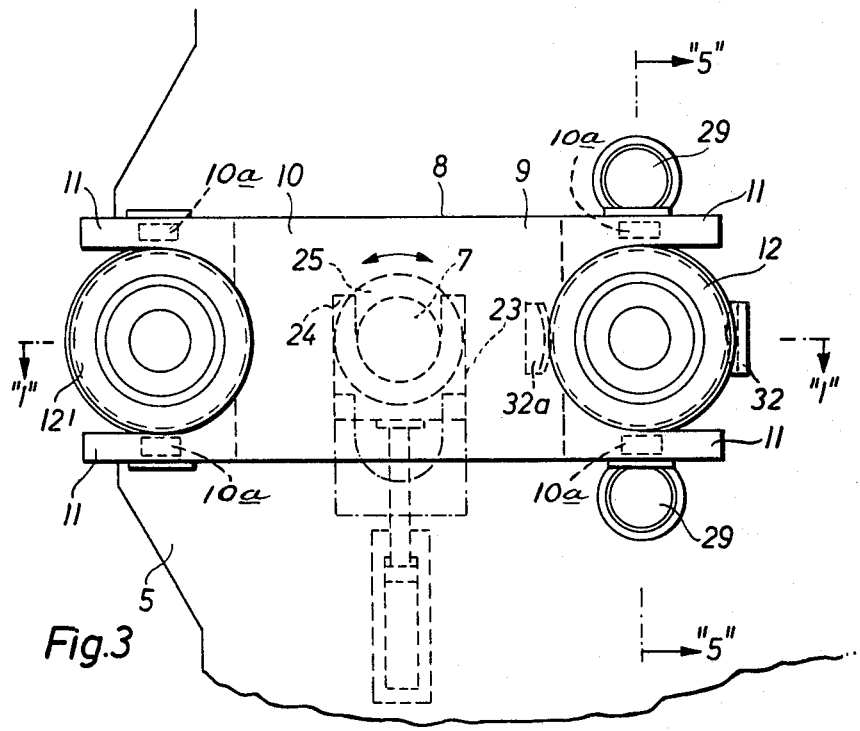
FIG. 3 is a view in elevation of the double arm and countersupport in the direction of the arrow 3 in FIG. 1.

The shaft 7 can be locked against axial displacement by means of a fork-like lock bolt 23 (see FIG. 3), the arms 24 of which engage behind a flange 25 on the shaft 7 in the position shown in FIG. 4 and are themselves guided by means of ledges or bars 26 on the countersupport 5.

The main purpose of the double arm 8 is to change the dies. That end thereof which is located away from the axis X—X of the press (FIG. 1), at any given time, can be equipped during the extrusion process with a fresh die 12' and thrust plate 16', which are then brought into the axis of the press by turning the arms through 180°. The outwardly directed arm 10, with its supporting lugs 10a (FIG. 4) arranged at the top thereof, also has the additional purpose of supporting itself against the front face 27 of the countersupport 5.

The arms 9 and 10 are provided at their ends with longitudinal slots 28 extending radially with respect to the axis 6 (FIG. 1) and the width of which slots 28 corresponds substantially to the stroke of the cylinder and piston drive 18, 19, while they extend in depth considerably beyond the axis X—X of the press at the extrusion position.

Figure 5:
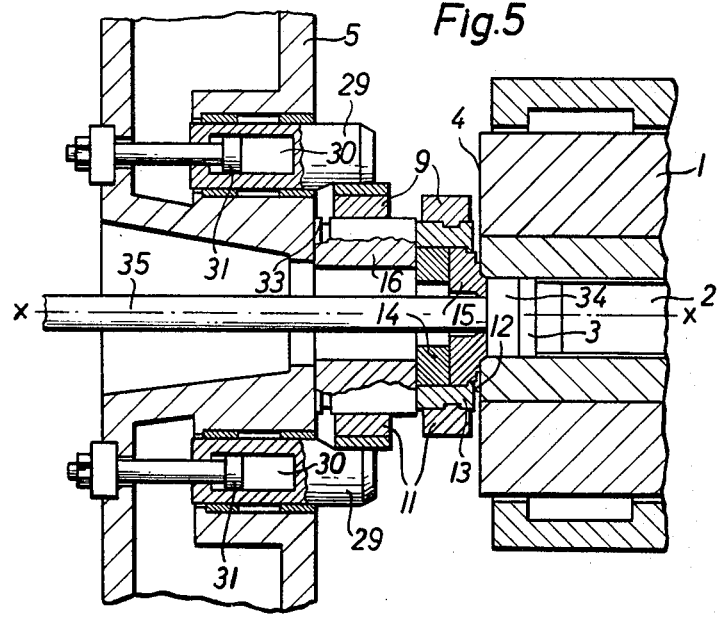
FIG. 5 is a section on the line 5—5 in FIG. 3, with the press in the extrusion position.
Figure 6:
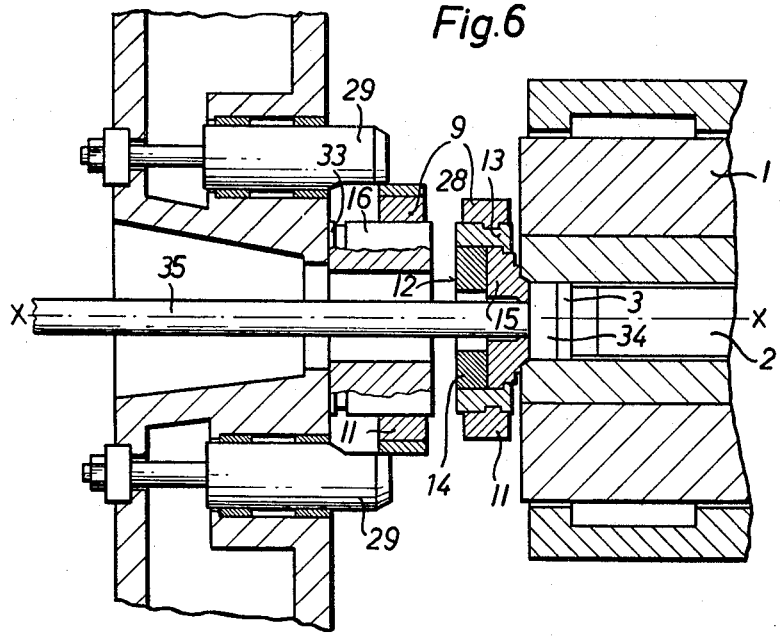
FIG. 6 is a section corresponding to FIG. 5, with the cylinder retracted.

According to FIGS. 5 and 6, two bolts 29 are mounted slidably in the countersupport 5 and are arranged one above the other in the vertical direction in the plane of the axis X—X. In the position shown in FIGS. 5 and 6, these bolts engage over the forks 11 of the arm 9 swung into the extrusion position, and thereby secure the double arm 8 in the radial direction with respect to the axis X—X. The bolts 29 can be drawn back hydraulically from the position shown in FIGS. 5 and 6. To this end, like the shaft 7, they are in the form of cylinders 30 in which fixed pistons 31 are arranged. Fluid under pressure is admitted to the cylinders 30 at either side of the piston 31 to control movement of the bolts.

Retaining ledges 32 and 32a, shown in FIGS. 1 to 4, of angular profile are mounted on the countersupport 5 on both sides of the axis X—X of the press. These ledges serve to retain the particular thrust plate 16 which is in the extrusion position, and which is provided with a flange 33 in position to pass behind the ledges 32 and 32a when either arm of the die carrier 8 is swung inward to extrusion position. Hence, the ledges 32 and 32a secure the thrust plate 16 against axial displacement, but without impeding the radial movement which it performs when the double arm 8 rotates.

The press is operated in the following manner:

When an extrusion operation has been completed in the extrusion position according to FIGS. 1, 4 and 5, the extrusion residue 34, which is attached to the extruded material 35, is still contained in the cylinder between the extrusion plate 3 and the die 12. In order to detach the extrusion residue from the die, to which it adheres tightly, the cylinder 1 and the extrusion plunger 2 are retracted and thereby reach the position shown in FIG. 2, while the double arm 8, which is retained by the lock bolt 23, remains in the position shown in FIG. 1. The considerable force which is required for pulling the extrusion residue 34 away from the die 12 tends to bend the arm 9. This force, however, is taken up by the shaft 7 secured against displacement by means of the lock bolt 23 and also owing to the fact that the opposite arm 10 is supported against the face 27 of the countersupport 5 by means of supporting lugs 10a. Hence the shaft 7 is completely relieved of bending forces.

Figure 2:
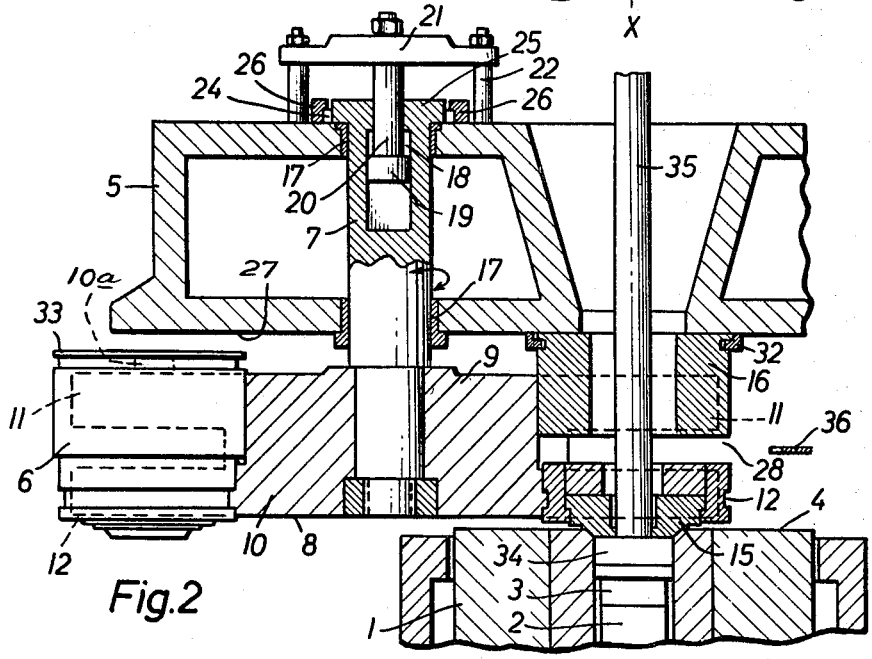
FIG. 2 is a corresponding section, with the press in a sawing position.

When the extrusion residue 34 has been detached from the die 12, the lock bolt 23, with its arms 24, is drawn back and the double arm 8, which is thereby released, is moved into the position shown in FIG. 2 by the control of fluid pressure admitted to the cylinder 18. In this operation, the thrust plate 16, which is located in the extrusion position and is secured by means of the ledges 32 and 32a to the countersupport 5, remains stationary, thus separating from the die 12. It thereby exposes the slot 28, into which a saw 36 can be run (FIG. 2) for the purpose of detaching the extruded material 35.

The extruded material 35 can now be withdrawn and the double arm 8 is again moved axially into the extrusion position shown in FIG. 1. The extrusion residue 34 with the remaining piece of extruded material which has been left thereon can now be brought out. To this end, the cylinder 1 and the extrusion plunger 2 are retracted further; the cylinder is then stopped and the extrusion plunger 2 is advanced again so as to force the extrusion residue out of the cylinder 1.

It is a particular advantage that the press, as far as the removal of the residue 34 is concerned, may also be operated in the usual manner. In such usual manner, the extrusion residue is again detached from the die by retracting the cylinder 1 and the plunger 2, as described above. However, the double arm 8 is then left in the position shown in FIG. 1, and the cutting of the extruded material is carried out in the gap formed between the disc 15 and the face of the cylinder 1 after the latter has been retracted. The cylinder, together with the residue and the short stump forming part of the residue and protruding over the face of the cylinder, is then moved back into the position shown in FIG. 1, thereby pushing the extruded material out of the orifice of the disc 15.

This method, although simple, may however be applied only if the cross-sectional area of the extruded material and the strength of the material are sufficiently large, because otherwise the stump as well as that part of the extruded material protruding from the disc 15 would be bent and buckled when the cylinder is moved back into the position shown in FIG. 1.

While the invention has been illustrated and described in one embodiment, it is recognized that variations and changes may be made therein without departing from the invention set forth in the claims.

We claim:

1. An extrusion press for extruding metal, the combination comprising a countersupport, an axially movable cylinder having an extrusion axis extending lengthwise thereof, an arm member rotatably mounted about an axis parallel to and offset laterally from said extrusion axis, a die member positioned at the extrusion axis of said cylinder, a thrust plate carried by said arm member and supporting said die member against said countersupport during extrusion, retaining means provided on said countersupport and securing said thrust plate to said countersupport when said arm member and said thrust plate are in the extrusion position, lug means bearing between said countersupport and a portion of said arm member located on the side of said axis of rotation remote from said extrusion axis, and means axially moving said arm member for introducing a cutting means between said thrust plate and said die member after said die member has been retracted axially by said arm member.

2. An extrusion press for extruding metal, the combination comprising a countersupport, an axially movable cylinder having an extrusion axis extending lengthwise thereof, an arm member rotatably mounted about an axis parallel to and offset laterally from said extrusion axis, a die member positioned at said extrusion axis of said cylinder, a thrust plate carried by said arm member and supporting said die member against said countersupport during extrusion, retaining means provided on said countersupport and securing said thrust plate to said countersupport when said arm member and said thrust plate are in the extrusion position, reciprocably mounted bolt means for engaging the free end of said arm member in the extrusion position thereof for locking said arm member against rotation, and means axially moving said arm member for introducing a cutting means between said thrust plate and said die member after said die member has been retracted axially by said arm member.

3. In a press according to claim 2, wherein said bolt means comprise a pair of bolts reciprocably mounted on said countersupport and spaced about said extrusion axis for bearing against opposite sides of said arm member when in the extrusion position.

4. In a press according to claim 1, wherein said lug means ejects from said arm member and bears against said countersupport.

References Cited

UNITED STATES PATENTS

| | | | |
|---|---|---|---|
| 2,896,782 | 7/1959 | Billen | 72—255 |
| 3,119,493 | 1/1964 | Zilgers | 72—263 |
| 3,124,250 | 3/1964 | Krause | 72—263 |
| 3,127,014 | 3/1964 | Dohrn | 72—263 |

CHARLES W. LANHAM, *Primary Examiner.*

RICHARD J. HERBST, *Examiner.*

K. C. DECKER, *Assistant Examiner.*